United States Patent
Kuhstrebe (10) Patent No.: US 7,097,584 B2
(45) Date of Patent: Aug. 29, 2006

(54) SYNCHRONIZATION DEVICE FOR A DUAL CLUTCH GEARBOX BASED ON AT LEAST ONE PLANETARY GEAR SET, AND CORRESPONDING DUAL CLUTCH GEARBOX

(75) Inventor: Jochen Kuhstrebe, Biebelried/Westheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 111 days.

(21) Appl. No.: 10/508,164

(22) PCT Filed: Mar. 28, 2003

(86) PCT No.: PCT/EP03/03266

§ 371 (c)(1),
(2), (4) Date: Sep. 17, 2004

(87) PCT Pub. No.: WO03/083325

PCT Pub. Date: Oct. 9, 2003

(65) Prior Publication Data

US 2005/0221943 A1    Oct. 6, 2005

(30) Foreign Application Priority Data

Mar. 30, 2002    (DE) ............................... 102 14 478

(51) Int. Cl.
*F16H 37/02*    (2006.01)

(52) U.S. Cl. ........................................... 475/218
(58) Field of Classification Search ........... 74/339, 74/330, 331; 475/218, 219

See application file for complete search history.

(56) References Cited

U.S. PATENT DOCUMENTS

| 4,727,764 | A |   | 3/1988 | Klaue |
| 4,802,375 | A |   | 2/1989 | Stodt |
| 5,052,986 | A | * | 10/1991 | Jarchow et al. ............ 475/76 |
| 6,464,059 | B1 |   | 10/2002 | Kundermann et al. |
| 6,634,986 | B1 | * | 10/2003 | Kima ........................ 477/107 |
| 6,668,994 | B1 |   | 12/2003 | Hirt |
| 6,845,682 | B1 | * | 1/2005 | Bulgrien ..................... 74/331 |

FOREIGN PATENT DOCUMENTS

| DE | 34 17 504 A1 | 11/1985 |
| DE | 35 27 399 A1 | 2/1987 |
| DE | 35 43 269 A1 | 6/1987 |
| DE | 37 13 106 C2 | 1/1989 |

(Continued)

*Primary Examiner*—Dirk Wright
(74) *Attorney, Agent, or Firm*—Davis & Bujold, P.L.L.C.

(57) ABSTRACT

A dual clutch gearbox for a motor vehicle comprising a first gearbox input shaft (20) with which at least one first gear is associated, and a second gearbox input shaft (22) with which at least one second gear is associated. An outer gearbox input shaft (22) embodied as a hollow shaft surrounds an inner gearbox input shaft (20), and a synchronization device is provided inside the gearbox. The synchronization device comprises at least one planetary gear set (30, 40) and an associated braking device (50), the planetary gear set being arranged with its sun gear, planet carrier and internal ring gear, essentially coaxially in relation to the gearbox input shafts (20, 22), and a first component (34; 42) selected from the sun gear, the planet carrier and the internal ring gear is coupled or can be coupled to the first gearbox input shaft (20) for the purpose of rotational engagement; a second component (32; 44) is coupled or can be coupled to the second gear box input shift (22) for the purpose of rotational engagement, and a third component (36; 46) can be braked by the brake device (50) of the synchronization device, which is supported or can be supported, directly or indirectly, on a gearbox housing.

21 Claims, 6 Drawing Sheets

FOREIGN PATENT DOCUMENTS

| | | |
|---|---|---|
| DE | 41 22 628 A1 | 1/1993 |
| DE | 44 36 526 A1 | 10/1995 |
| DE | 199 39 819 C1 | 11/2000 |
| DE | 199 40 288 C1 | 3/2001 |
| DE | 100 04 179 A1 | 4/2001 |
| EP | 0 845 618 A2 | 6/1998 |
| EP | 0 931 951 A1 | 7/1999 |
| GB | 2 335 010 A | 9/1999 |
| WO | WO-01/61214 A2 | 8/2001 |

* cited by examiner

SYNCHRONIZATION DEVICE FOR A DUAL CLUTCH GEARBOX BASED ON AT LEAST ONE PLANETARY GEAR SET, AND CORRESPONDING DUAL CLUTCH GEARBOX

This application is a national stage completion of PCT/EPO3/03266 filed Mar. 28, 2003 which claims priority from German Application Serial No. 102 14478.8 filed Mar. 30, 2002.

FIELD OF THE INVENTION

The invention concerns a dual clutch transmission for a motor vehicle, encompassing a first transmission input shaft, to which at least one first gear is assigned, and a second transmission input shaft, to which is assigned at least one second gear, wherein, in regard to the said transmission input shafts, which rotate on essentially the same axis in reference to one another, an outer transmission input shaft designed as a hollow shaft encloses an inner transmission input shaft, and a synchronization device within the said transmission enables, or at least supports, appropriate speeds of rotation from the transmission gear stages upon a shifting from a given gear of one of the transmission input shafts to a gear associated with the other transmission input shaft, in the presence of braking or acceleration. The invention is concerned further, with a synchronization device for a dual clutch transmission of this described type.

BACKGROUND OF THE INVENTION

In recent times, dual clutch transmissions and dual clutches have received substantial interest in a renewal of use. The reason for this is that such transmissions and clutches, in an automization of a transmission provide an ease of shifting, which is similar to the shifting of familiar transmissions possessing a torque converter. However, these mechanisms allow much to be desired as to the degree of efficiency in their operation. An essential advantage of the dual clutch transmission over conventional automatic transmissions with direct shifting, is related to a corresponding coordination between the transmission gear selection and the transmission input shaft. The act of shifting with the invented dual clutch takes place while the motor driving force remains active, that is, the driving power is still functioning during the execution of shifting from a gear stage assigned to one of the individual transmission input shafts to an assigned gear stage of the other transmission input shaft.

In accordance with a given gear stage, and other gear stages which can be involved, a relatively high degree of synchronization operation must be expended. Let it be noted here, as to the said gear stage, that, relative to the present gear to be abandoned and the desired gear to be shifted to, under certain circumstances, a driver will not choose to shift between gears which are not successive to one another in a manner free of driving power interruption, or torque drag. In the proposal here offered, among others, the dual clutch itself is active in the support of the synchronization—as far as possible—that is to say, it initiates the synchronization itself by means of appropriate activation of the clutch assignment. For example, DE 199 39 819 C1 discloses, in a special way, a procedure which favors internal transmission synchronization. The said internal synchronization cannot be eliminated, since the procedure presented in the said patent text only borders on the conventional synchronization rings and does not have the capability of accelerating above the motor speed of revolution currently in use.

Another possibility is, to provide synchronizing apparatuses of the conventional type (these being, for example, common synchronization rings and the like), but allowing a safety factor for a higher degree of loading in accord with the synchronous operation to be carried out by the transmission. This arrangement, however, must be executed with some attention to a relatively greater installation-space and finally, the conclusion is made, that such synchronization devices of the conventional kind are not to be considered the "optimum" for the intended use.

Another approach stresses the provision of special synchronization devices, which enable a transmission of torque between a first gear train shaft governing at least one set of gear train stages (for example, the even numbered forward gear stages) and at least a second gear train shaft to which is assigned another set of gear stages (for instance, the odd forward traveling gear stages). In this respect, DE 44 36 526 A1, discloses a synchronization of a dual clutch transmission, wherein, a transmission is proposed, on the basis of an additional shaft and gear pairs assigned thereto. DE 44 36 526 A1 teaches that the successive gear stages are to alter by a factor of "q". On this account, this arrangement is not suited for optional dual clutch transmissions. Because of the additionally required shaft, this transmission must be built even larger in the radial direction.

DE 34 17 504 A1 teaches additionally, of a synchronizing device based on multi-disk brakes in combination with a planetary gear set, which possesses a rotating shaft situated at a distance from and parallel to, the input shaft of the transmission. An additional planetary gear set is installed, which is coaxial to, or is on the same axis as the input shaft. This serves for the doubling of the gear stages before a 3-shaft-gear stage component, which can be shifted in or out by means of a shiftable clutch. The said shiftable clutch can also serve as a start-up clutch and is designed as a type of dual clutch. The said planetary gear set, which is provided for synchronization purposes and is not coaxial with the input shaft train, serves only for upward acceleration in regard to synchronization. For the braking operation, again in regard to the synchronization, the previously mentioned disk braking is employed.

Conversely to the above, the purpose of the invention is to create a dual clutch transmission with coaxial input shafts, which possesses a central synchronization device, which is compactly built, and without unwieldy mechanical attachments, and can be integrated into the transmission. The invented synchronization device, in addition, is to enable both an acceleration as well as a braking of a respective gear train shaft, and indeed—at least in a preferred development—both in regard to gear stages assigned to a first transmission input shaft and in regard to the gear stages assigned to the other transmission input shaft.

SUMMARY OF THE INVENTION

For the achievement of this purpose, the proposal is, in that the synchronization device possesses at least one planetary gear set and a braking facility associated therewith, which said set, with its sun gear, its planetary gear carrier and its internal gear is placed essentially coaxially with the input shaft of the transmission, and in that from the sun gear, from the planetary carrier, and from the internal gear, a first component is coupled with or can be coupled with (in the concept of a rotational come-along) the first transmission input shaft, a second component is coupled with or can be coupled with (in the concept of a rotational come-along) the second transmission input shaft, and a third component with a braking facility, which can directly or indirectly abut itself on the transmission housing, by means of which the synchronization device can be decelerated.

In accord with the invention, the planetary gear set is located on the same axis (is coaxial) with transmission input shafts and is itself coupled, or can be coupled, in the given manner, with the transmission input shafts. Additional transmission shafts are not necessary, and accordingly, the transmission can be constructed in a radially compact manner.

It is advantageously obvious, that the first component is bound fast with the first transmission input shaft, or is formed with this, or is of one piece therewith, and that the second component is bound fast with the second transmission input shaft, or is formed from this, or is of one piece therewith.

Experience has advantageously demonstrated, that the internal gear serves as the third component and can be braked by means of a braking facility.

Advantageously, provision has been made, to the effect that the synchronization device possesses two axially opposed planetary gear sets, which are of such design that i) both in a case of acceleration as well as deceleration (shifting down) from one first gear to a second gear, as well as ii) both in a case of acceleration as well as deceleration (shifting down) from one second gear to a first gear, a synchronization in the concept of a braking or an acceleration is enabled. Thus it is possible that both during shifting up as well as in down shifting, synchronization occurs by means of the synchronization device, or at least the synchronization is supported, this being independent, as to which transmission input shaft engages with the output shaft. What is meant here, are shift-procedures, wherein which shifting is carried out from an existing output gear stage, based on one transmission input shaft, to a desired gear stage, which is based on the other transmission input shaft.

It is appropriate that notation be made here, to the effect that additionally, more synchronization devices, somewhat of the conventional type, namely synchron rings and the like, can be provided, which, for example, are especially responsible for the synchronization of shifting procedures, wherein the currently used gear and the desired gear are assigned to the same transmission input shaft. It is, however, not of absolute necessity, that such shifting procedures are generally possible, or allowable.

As a development, the proposal is, that the planetary gear set or one of the planetary gear sets is connected to the transmission input drive shafts in such a way, that its sun gear is coupled to, or can be coupled to, the inner transmission input drive shaft in the concept of a rotational come-along attachment and its corresponding planetary gear carrier is coupled to, or can be coupled to, the outer transmission input shaft.

A further possibility which can be realized either in a case of two planetary gear sets, or in an alternative situation wherein only one planetary gear set is provided, is that the planetary gear set or one of the two planetary gear sets, is connected to the transmission input shafts in such a way, that its planetary gear carrier is coupled to, or can be coupled to, the inner transmission input shaft in the concept of rotational come-along attachment and its sun gear is coupled to, or can be coupled to the outer transmission input shaft, in the concept of rotational come-along attachment.

In the case of two planetary gear sets, to achieve a contribution to savings in size of construction, and to favor the reduction of any multiplicity of components, it is preferred, that the sun gear of the one planetary gear set and the planetary carrier of the other planetary gear set be secured tightly to one another for mutual rotation and, advantageously can be parts, or sections, of an integral or one-piece constructed unit.

Experience has especially shown, that is to advantage to place at least one planetary gear set, in an axial zone of the transmission input shafts, thus within the transmission housing wherein the outer transmission input shaft ends. The mechanical expense in labor and funds for the integration and coupling of the planetary gear set is, in the projected arrangement, particularly low in cost. This is especially true in such a case, wherein two planetary gear sets have been provided. In this case, it is of particular advantage, that the planetary gear sets be placed in an axial zone of the transmission input shafts within the transmission housing in which the outer transmission input shaft ends. In this connection, a developmental proposal is, to place the planetary carrier axially beyond the end of the outer transmission input shaft.

The said planetary carrier being coupled, in the concept of a rotational come-along, with the inner transmission input shaft. In connection with kind of coupling of the planetary gear sets onto the transmission input shafts, many possibilities are at hand. A preferred formation characterizes itself therein, in that the outer transmission input shaft possesses a first section which approaches, within the transmission housing, the end of the input shaft, or may indeed possess the said end. Further, the outer transmission input shaft possesses a second section, which is remote from its end. The said first and second sections are joined together in mutual rotation by a planetary gear carrier. Another, likewise advantageous possibility is, that the outer transmission input shaft has at least one opening. Through this opening a planetary gear can extend itself to engage a sun gear. The said planetary gear is carried by a planetary gear carrier and this carrier is coupled with or can be coupled with, the outer transmission input shaft, in the concept of a rotational come-along connection. The said sun gear is coupled with or can be coupled with, the inner transmission shaft, in the concept of a rotational come-along connection.

Considerable cost savings are gained, because of the said reduced number of components, if in the case of two planetary gear sets, the said two planetary gear sets possess, respectively, the same sun gear diameters with the same number of teeth, internal gears of the same diameter with the same number of teeth. In the case of the internal gears of the same diameter, there is to be found the additional advantage, that even provided disk packets of the braking facility for the two planetary gear sets can be fabricated to be identical. This arrangement of equivalent parts is possible under the presupposition, that the braking facility acts upon the internal gears, this being also the preferential method.

It is a proven advantage, if the planetary gear set is made with three planetary gears, or it is similarly an advantage if planetary gear sets respectively possesses three planetary gears. Giving consideration to the costs of the technical aspects of manufacture, and the requirements for construction space, it is further of advantage, if the planetary gear carrier, or one of the planetary gear carriers is made as a disk plate with at least one protruding rotational shaft for an assigned planetary gear.

As already explained, the braking facility can be made as a multi-disk brake. In the case of the multi-disk brake, preference is given to a wet-running multi-disk brake.

Where multi-disk brakes are concerned, a development proposes, that these possess: at least one, hydraulic actuator, at least one disk projecting outward from and bound to a respective internal gear in a rotational come-along connection, and at least one disk abutting the transmission housing to avoid turning; whereby the at least one disk projecting outward from and bound to a respective internal gear and the at least one disk abutting the transmission housing to avoid turning, by means of the intervention of the at least one actuator, can be brought into a mutual frictional engagement, to the end that the internal gear is subjected to braking. The actuator can, with advantage, be made as a hydraulically activated cylinder/ring-piston combination. A particularly favored construction of the dual clutch transmission characterizes itself thereby, in that for both planetary gear sets at least one actuator can be assigned, this actuator being constructed as a double-action cylinder-piston combination, which advantageously can be made as a double-action cylinder-ring-piston combination, by the interposing of which, optionally, either the internal gear of the one planetary gear set, or the internal gear of the other planetary gear set can be braked.

Further, the proposal is, that the dual clutch transmission possess a sensor arrangement, for the determination of at least two of the speeds of rotation specified for the gear stages. Proposed is also to have a control/regulation apparatus, which captures the speed of rotation signals issued from the sensor arrangement, and, based on the received signals, and in connection with a shifting procedure, said apparatus controls the braking facility, i.e., at least one of the braking facilities, and by the interposition of braking the speed of rotation, and/or the acceleration of the same, said apparatus can synchronize or to least support a synchronization.

The invention concerns further, a motor vehicle drive chain, including a primary power unit, an invented transmission, as has been described in the foregoing and has been explained in regard to preferred developments and includes a dual clutch for the transmission of torque between the primary power unit and the transmission. In the case of the dual clutch, this can well be, to advantage, a wet-running, multi-disk, double clutch, for instance as these have been proposed by the applicant in various patent applications.

The invention concerns further, a synchronization device for an invented dual clutch transmission including at least one planetary gear set and a thereto adaptable braking facility, whereby the planetary gear set, with its sun gear, its planetary gear carrier and its internal gear is axially aligned to the transmission input shafts, or can be so aligned, and whereby, in regard to the sun gear, the planetary carrier and the internal gear, a first component is coupled, or can be coupled, in the concept of a rotational come-along, with the first transmission input shaft, a second component is coupled, or can be coupled, in the concept of a rotational come-along, with the second transmission input shaft, and a third component, by means of the braking facility, which directly, or indirectly abuts a transmission housing, renders the synchronization device to be capable of being braked. The synchronization device can be additionally and advantageously further developed in accord with the above descriptions of embodiments and explanations.

BRIEF DESCRIPTION OF THE DRAWINGS

The invention will now be described, by way of example, with reference to the accompanying drawings in which the invention is shown in a schematic manner in a symbolic drawing;

FIG. 1 shows in the partial FIGS. 1a and 1b, in schematic form, respectively a motor vehicle, drive chain, with a drive unit, a dual clutch transmission and a dual clutch transmission with integrated central synchronization device;

FIG. 3 shows an enlarged section of the central synchronization device with the details of the arrangement in accord with FIG. 1a;

DETAILED DESCRIPTION OF THE INVENTION

The embodiment examples shown in FIGS. 1 to 5 demonstrate, respectively, a drive chain, that is to say, a section of the dual clutch transmission of the said drive chain, and, indeed, a more schematic or symbolic presentation of the transmission. The transmission possesses two coaxially running input shafts. The even numbered gear stages (the "first" gear stages) are connected to the first of the transmission input shafts. The odd numbered gear stages (the "second" gear stages) are connected to the second of the transmission input shafts. Or, actually, this can be reversed. In addition, the reverse gear is assigned to one of the transmission input drive shafts. A gear train for rotational reversing for the reverse gear has been omitted in the transmission drawing, as it has no interest for the present purpose.

Figure 1A:
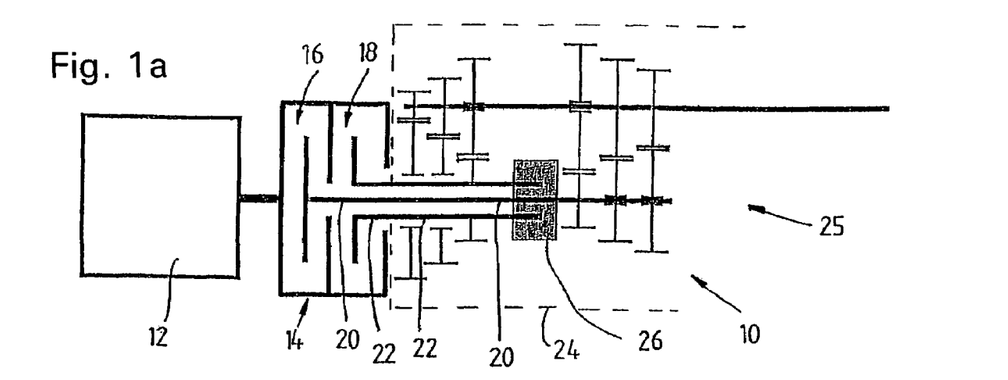
Figure 1B:
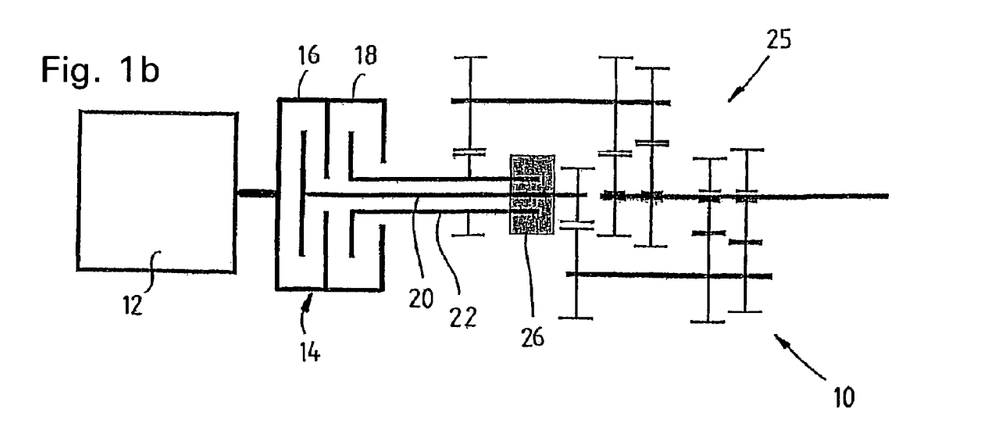

The drive chain 10 of the FIGS. 1a and 1b encompasses a drive unit 12, for example, an internal combustion motor, i.e., a fuel consuming engine. On the output side of the input drive unit is provided a dual clutch 14, which can be constructed as a wet-running, multi-disk clutch arrangement, which can be, for example, in accord with the designs of the applicant. Reference can also be made to a wet-running dual multi-disk clutch apparatus in a plurality of embodiment variants as seen in DE 100 04 179 A1. In the case of the dual clutch 14, it is also a possibility, that a dry running dual clutch of the friction disk method can be considered. For this reference can be made to EP 0 931 951 A1. The dual clutch serves for torque transmission between the drive unit 12 and the transmission 25, which is assigned to that clutch in the arrangement of two coaxially aligned transmission input shafts 20 and 22.

The dual clutch possesses a first clutch position 16 and a second clutch position 18. By means of the first clutch position 16, a first, radially inner transmission input shaft 20 can be brought, frictionwise, into a torque transmitting connection with an input side of the dual clutch 14 and therewith in connection with an output drive shaft of the drive unit. By means of the second coupling position 18, a second, radially outer, and therewith accordingly made as a hollow transmission input shaft 22 with the input of the double clutch 14, can be brought, frictionwise, into a torque transmitting connection with an output shaft of the drive unit. The transmission input shafts 22 extend themselves together into a transmission housing 24, which housing is indicated in FIG. 1*a* by dotted lines. In an end zone of the radially outer hollow shaft 22, and within the transmission housing 24, is presented in FIGS. 1 and 2 a synchronization device 26, denoted only as a "black box", which is coupled with the two transmission input shafts. The central synchronization device 26 possesses two planetary gear sets, which enables a synchronization of speeds of rotation of the two transmission input shafts, with attention given to a braking or acceleration operation to match that that allowed by the final selected driving gear. This is possible in two modes of shifting. The first mode is shifting from one of the output gear sequences which is assigned to the first transmission input shaft, to a desired gear sequence which is assigned to the second transmission input shaft. The second mode is shifting from one of the output gear sequences assigned to the second transmission input shaft to a desired gear sequence assigned to the first transmission input shaft.

The invented central synchronization device 26 is available—at least in accord with a preferred realization—without adding extra shafts or bearing points. This said apparatus 26 is compactly constructed and can be controlled with a simple regulatory means. The two planetary gear sets consist, each, of a sun gear and planetary gears mounted on an internal gear, i.e., this being an inside ring gear (hereinafter, "internal gear"). The sun gear, the planetary carrier and the internal gear all rotate on the same axis which runs through the center of the sun gear and coincides with the common axis of rotation of the two transmission input shafts which are in mutual, coaxial alignment.

As may be seen in FIG. 3, the design of the central synchronization device 26 can be as follows. In a first planetary gear set 30, the outer (second) transmission input shaft 22 is coupled with the planetary gear carrier 32. The inner (first) transmission input shaft 20 carries the sun gear 34. The planetary gear carrier 32 is rotationally securely bound to the second transmission input shaft 22. The sun gear 34 is likewise rotationally securely bound to the first transmission input shaft 20. A plurality of planetary gears 38 mesh with the sun gear 34 and with an internal gear 36.

In a corresponding manner, the second planetary gear set 40 is realized, with a different assignment of the planetary gear carrier and the sun gear to the transmission input shafts. In this case, the radially outer (second) transmission input shaft 22 carries the sun gear 44, while the planetary gear carrier 42 is coupled with the inner (first) transmission input shaft 20. The sun gear 44 and the planetary gear carrier 42 are rotationally securely bound, each to its respective transmission input shaft. Planetary gears 48 mesh with the sun gear 44 and with the internal gear 46.

For both planetary gear sets 30 and 40, the internal gears 36 and 46 are free to rotate, but can be braked by a thereto dedicated, braking facility 50, which is within the transmission and abuts the housing thereof. In accord with the braking, of the respective internal gear, the planetary gears roll on the inner toothing of their respective internal gear, which brings about a torque transfer between the planetary gear carrier and the sun gear, and correspondingly between the two transmission input shafts, which rotate in the same direction. In accord with the situation, a faster or slower gear ratio can be made, as will be explained in the following.

If the internal gears can turn freely, then the speeds of rotation of the transmission input shafts—overlooking drag torque for the moment—are fully independent and do not influence one another. If one of the internal gears by means of the respective braking facility is subjected to braking, then this acts in turn as a braking on the planetary gear carrier and counter to the sun gear, that is, the sun gear accelerates, contrary to the planetary carrier. In accord with the braking of the involved internal gear, then both the inner transmission input shaft 20 and the outer transmission input shaft 22 are braked or accelerated. If, as is stated above and preferred, the assignment of the gear stages to the transmission input shafts is of such a nature, that the even numbered forward gears become coupled with one transmission input shaft, and the odd numbered forward gears become coupled with the other transmission input shaft, then, by shifting between successively following gears or—more generally—upon shifting between one of the output forward gears of one transmission input shaft and one of the other desired forward gears of the other transmission input shaft, it becomes possible to synchronize the respective, torque transferring, transmission input shaft, assigned to the output gear by means of interposing the planetary gear sets, with the other transmission input shaft.

Figure 3:
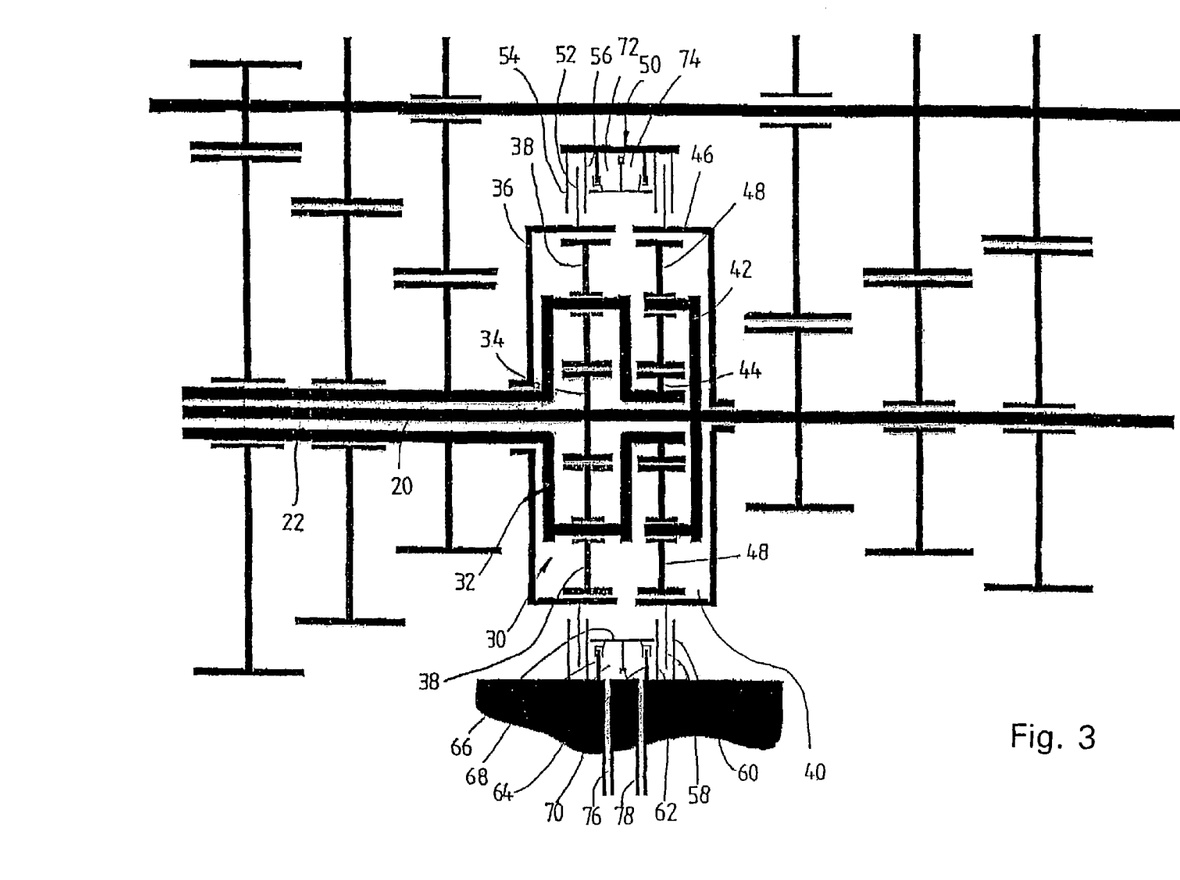

FIG. 3 shows schematically, or symbolically, a preferred design of the braking facility 50 which, in common, affects the two internal gears 36 and 46. The braking facility possesses at least one friction disk 52, which is carried rotationally secured by the internal gear 36, and which said disk protrudes radially outward, entering between two frictional disks 54, 56 anchored to the transmission housing to prevent rotation. The housing immobilized friction disk 54 is further axially supported at a point proximal to the drive unit.

In a corresponding manner, the internal gear 46 carries, rotationally secured, at least one friction disk 58, which is placed axially between two housing-anchored, radially inward extending disks 60 and 62. The friction disk 60 is further axially supported at a point remote from the drive unit. To the two internal gears 36 and 46, it is possible that also respectively disk packets with a plurality of friction disks can be added. The friction disks can be made in such a way, that pairs of smooth and friction coated disks can be supplied.

Between the disks 52, 54 and 56 on the one hand, and the disks 58, 60, and 62 on the other hand, is to be found a double action cylinder and ring piston combination 64. This said combination possesses a ring piston 66 having a cross-section which approaches the shape of a "T". The ring piston 66, by means of its axially extending section, its radially extending section, and as well the inwardly extending wall sections 68 and 70 which are secured to the transmission, encloses two annular shaped hydraulic slave cylinders 72 and 74, into which hydraulic medium enters through a respective feed line 76, 78. The hydraulic pressure medium brings either the disk braking facility 52, 54, 56 or the disk braking facility 58, 60, 62 into frictional braking engagement. When this occurs, then, corresponding to the established pressure in the respective slave cylinder, a braking effect on the planetary carriers 36, 46 is carried out. In regard to the hydraulic slave cylinder chambers, mention should be made, that in FIG. 3, symbolic seals are indicated, which act between the ring-piston 66 and the wall sections 68, 70, that is, a transmission housing section and thus seal the slave cylinder chambers 72, 74 from each other and from the outside.

The synchronization possibilities provided by the central synchronization device 26 can, for example, be explained in more detail as follows: Should, for example, a simple down shift (for instance, from the third gear into the second gear) be carried out, wherein the output gear lies on the radially outer (second) transmission input shaft 22, and the desired gear lies on the radially inner (first) transmission input shaft 20, then the inner transmission input shaft 20 must be accelerated. For this purpose, the internal gear 36 of the first planetary gear set 30, by means of the disk braking facility 52, 54, 56 is braked. The sun gear 34 of this planetary gear set is coupled to the inner transmission input shaft 20, and, as a result of the said braking, there results a transformation into rotation at a higher speed from the planetary carrier 32 to the sun gear 34, so that the inner shaft 20 is accelerated.

Should, for instance, a simple up-shifting occur (namely from second gear to third gear), wherein the output gear lies on the inner transmission input shaft 20 and the desired gear lies on the outer transmission shaft 22, then, as a rule, the outer transmission input shaft 22 to which the desired gear is assigned, must be braked. This can, be done, by the activation of the multi-disk brakes 52, 54, 56 by means of the cylinder/ring piston apparatus 64. By means of the sun gear, which is coupled to the inner transmission input shaft 20, and with the intervention of the braked internal gear 36, a retraction into slower rotational speed at the planetary gear carrier 36 is enacted. The said, now decelerated carrier 36 is coupled with the radially outer transmission input shaft 22, so that this outer transmission input shaft 22 is subjected to braking.

Should, for example, a simple downshift (for instance, from second gear to first gear) be carried out, wherein the shifting is to be from an output gear lying on the radially inner transmission input shaft 20, to a desired gear lying on the radially outer transmission input shaft 22, then, the said outer transmission input shaft 22, to which the desired gear is attached, must be accelerated. This can be executed by an activation of the multi-disk brake 58, 60, 62 by means of the cylinder/ring piston combination 64. By the braking of the internal gear 46 of the second planetary gear set 40, a conversion into faster rotational speed from the planetary gear carrier 42, which is coupled to the inner transmission input shaft 20 to the sun gear 44, which is coupled to the outer transmission input shaft 22, to the end that the outer said transmission shaft 22 is accelerated.

If, for example, a simple upshift (for instance, from the first gear to the second gear) is carried out, from an output gear lying on the outer transmission input shaft 22 to a desired gear lying on the inner transmission input shaft 20, then the inner transmission input shaft 20 must, as a rule, be braked. This can again be done by the activation of the multi-disk brake 58, 60, 62. The braking of the internal gear 46 causes a transformation into a slower rotational speed of the sun gear 44 which is coupled with the outer transmission shaft 22, to the planetary gear carrier 42 which is coupled with the inner transmission input shaft 20, with the result, that the inner transmission input shaft 20 is subjected to braking.

The foregoing provided examples show clearly, that by means of the two planetary gear sets 30 and 40, each shift, wherein the shifting takes place from one to the other transmission input shafts, can be synchronized or, at least, a synchronization is possible.

As is to be seen in FIG. 3, the two planetary gear sets 30 and 40 lie directly beside one another within the transmission housing at the end of the outer transmission input shaft 22. Such an positional arrangement is very advantageous, since thereby construction space is saved and a simple coupling with the transmission input shafts is made possible. Preferably, that planetary gear set, namely planetary gear set 40, is seated axially beside that end of the outer transmission input shaft 22 which is inside the transmission housing. The sun gear 44 of planetary gear set 40 is rotationally securely affixed to the outer shaft 22.

Moreover, FIG. 3 demonstrates an example of one mode of construction, wherein an outward located, axially longer section which leads to the dual clutch of the outer transmission input shaft 22 and an inner, axially shorter section of the outer transmission input shaft 22, which carries the sun gear 44, are coupled together by means of the planet gear carrier 32 for common rotation.

Figure 4:
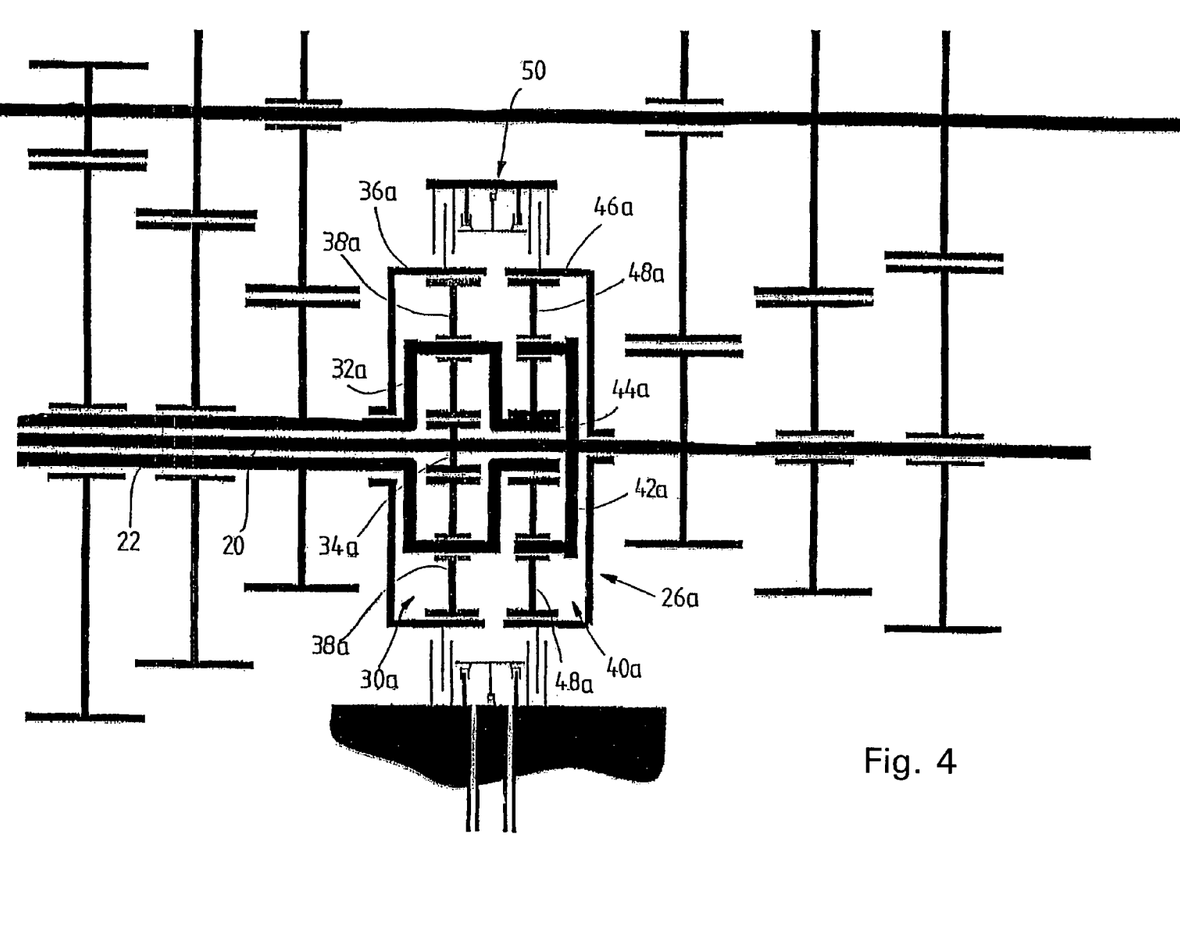
FIG. 4 shows an embodiment variant of the control synchronization apparatus in a presentation according to FIG. 3.

Another possibility, which is illustrated in FIG. 4, is that the two planetary gear sets 30a, 40a are so coupled with one another, that the sun gear 44a of the planetary gear set 40a which is more distant from the drive unit is directly connected to planetary gear carrier 32a of the other planetary gear set 30a. More exactly phrased, the sun gear 44a, lying to the right in the drawing, is directly installed on the planetary gear carrier 32a, or is constructed as one piece with the same. A further difference to the embodiment example shown in FIG. 4 is that the sun gears 34a and 44a exhibit a smaller diameter than do the sun gears 34 and 44. The two sun gears of the respective synchronization device 26, 26a possess, however, the same diameter. The same is valid for the planetary gears 38, 48 or 38a, 48a and the internal gears 36, 46, or 36a, 46a. This enables achieving the advantage, that many components which are used are identical. If the diameters of the internal gears are the same, then, this can be extended so that identically constructed brake-disk-packets can be made for the two respective planetary gear sets or for their internal gears. The planetary gear carriers are, preferably, made as disks, from which extensions protrude perpendicularly, on which extensions the planetary gears are rotatably set in bearings (see FIG. 6).

In regard to braking facility 50, mention should be made, that as "braking facility" for the two internal gears, multi-disk clutches or multi-disk brakes of the known kind used for automatic transmissions can be used. Such braking facilities are expected to abut against the transmission housing. Instead of the double-action cylinder-ring piston combination, which acts either in one axial direction on the other multi-disk brake, or yet acts in the other axial direction on the other multi-disk brake and thereby either the one or the other internal gear is subjected to braking, it is possible that other actuators, for example at least two one-way acting cylinder/piston combinations (of course, acting in different directions) or electronic actuators can be employed.

Figure 5:
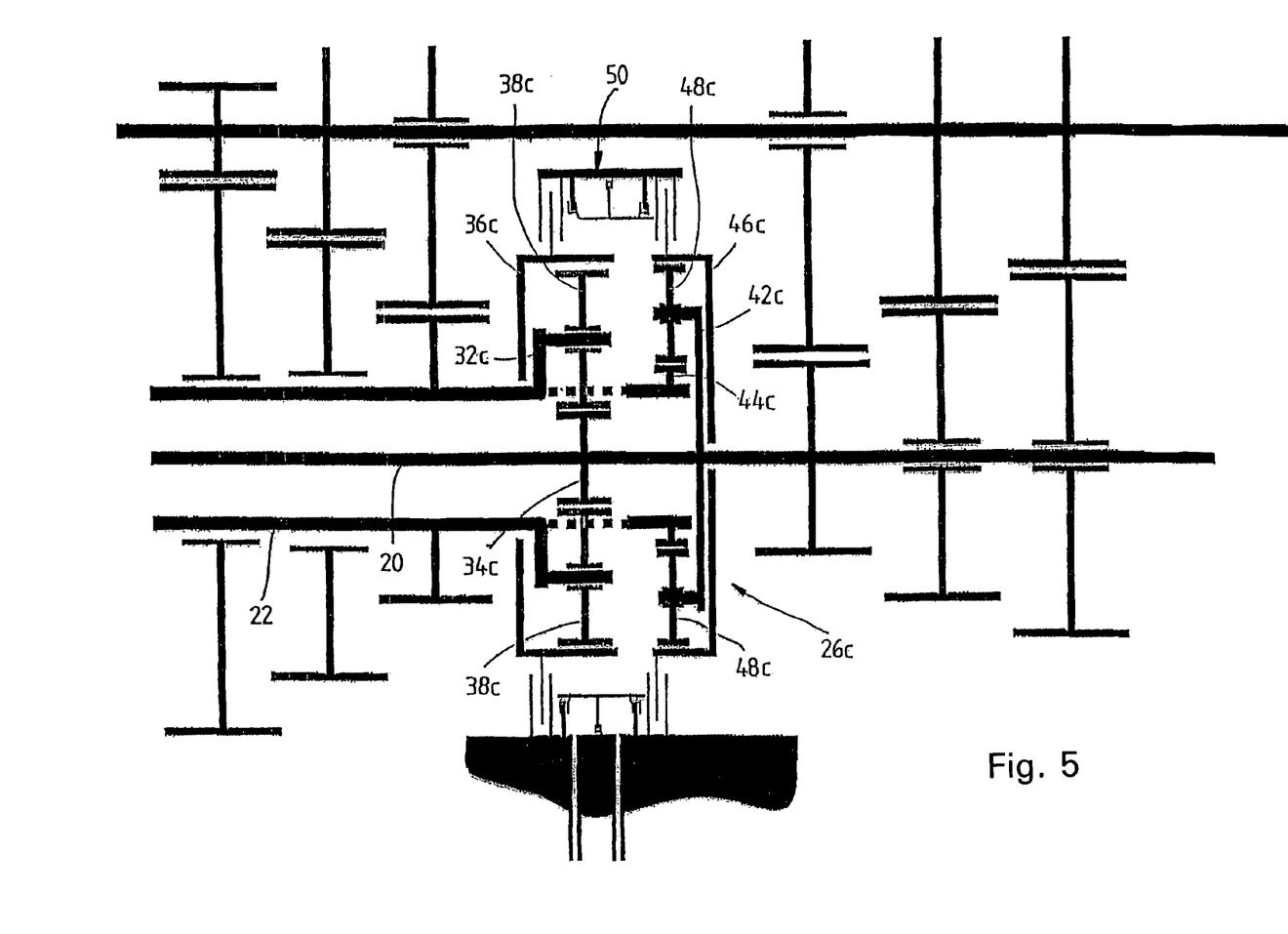
FIG. 5 shows an additional embodiment variant of the central synchronization device in a presentation according to FIG. 3.

FIG. 5 shows a somewhat different construction, wherein the sun gears 34c and 44c and, with internal gears 36c and 46c are respectively of the same diameters, and in accord with which, the planetary gears 38c and 48c exhibit different diameters. The planet gear carrier 32c, which is coupled to the outer transmission input shaft 22, and can be preferably partially constructed therefrom, carries planet gears 38c. The said planet gears 38c, by means of a respective opening or cutout of the outer transmission input shaft 22, can make an engagement therethrough, in order to mesh with the sun gear 34c, which said sun gear 34c is placed radially within the outer transmission input shaft 22, and is rotationally securely bound to the inner transmission input shaft 20. It is possible to consider, that the radially projecting section of the planetary carrier 32c, which bears the projecting extensions for the planetary gears 38c, could be built out of the circumference of the outer transmission input shaft 22, from which it certainly it would be possible to form radial, outwardly inclined, rim-like sections or flange segments.

The other sun gear 44c sits directly on the end section of the outer transmission input shaft 22.

Figure 6:
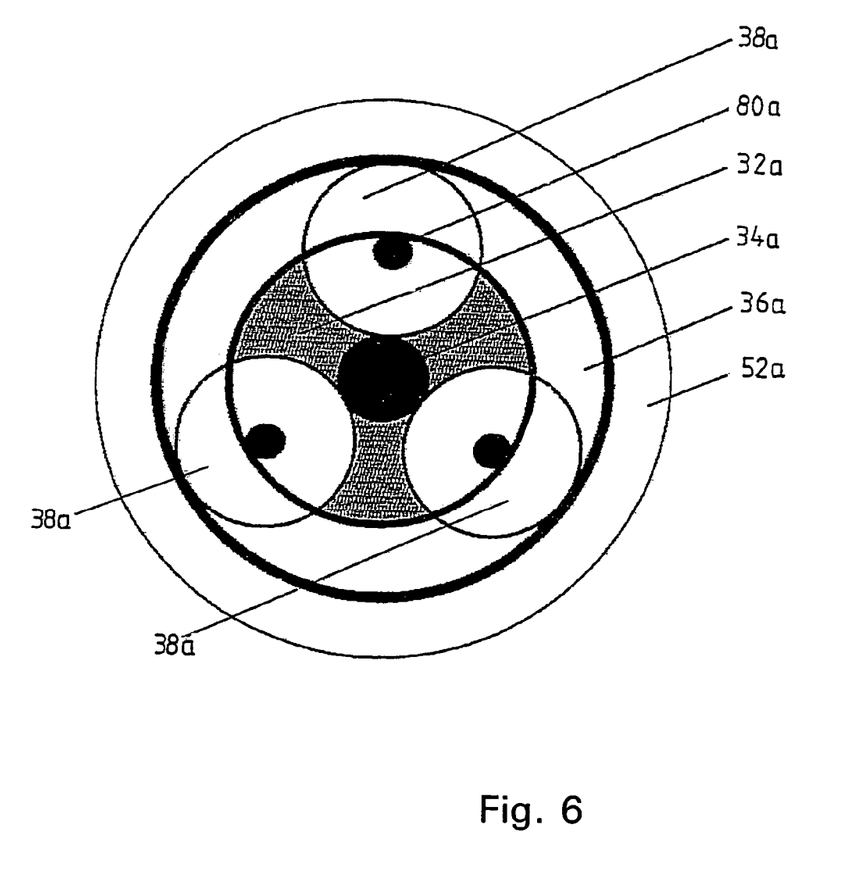
FIG. 6 shows a schematic axial view of a planetary gear set of the central synchronization device.

FIG. 6 shows, symbolically, an axially directed view on the planetary gear set which is proximal to the drive unit, for example, the planetary gear set 30a of the FIG. 4. It is obvious from FIG. 6, that the sun gear 34a, which finds itself in the center, is seated on the inner transmission input shaft 20. Meshing with the said sun gear 34a are three planetary gears 38a, the extension pieces for which, actually axles, extend perpendicularly from the planet gear carrier 32a and are firmly bound thereto, or are a piece thereof. The planet gear carrier 32a is again rotationally securely bound to the outer transmission input shaft 22. The internal gear 36a serves as a disk carrier for at least one radial disk 52a which projects therefrom. The at least one disk 52a is seated on the outer circumference of the internal gear 36a and forms, with associated transmission (housing) secured disks, the disk packet of a preferably wet-running multi-disk brake. By means of the relatively large diameter of the disks in comparison to the friction surfaces of conventional synchronization devices, such as blocking-synchronization, essentially greater synchronizes torques can be realized. It is now possible to completely omit blocking synchronization methods and the like, whereby the invented dual clutch transmission can be constructed in considerably less building space. Another possibility is, to supportingly provide the invented planetary gear synchronization, preferably double planetary gear synchronization with simple synchronizations.

A favorable possibility is, to manufacture the relevant components, namely, for example, the gears of the planetary gear sets, economically from sinter material. For example, the gears of sinter material can be stamped out. The expert would be guided to available sinter materials, which can handle synchronization torques (for instance, up to 20 Nm) and withstand the occurring temperatures in the transmission, (possibly up to 150° C.).

Figure 2:
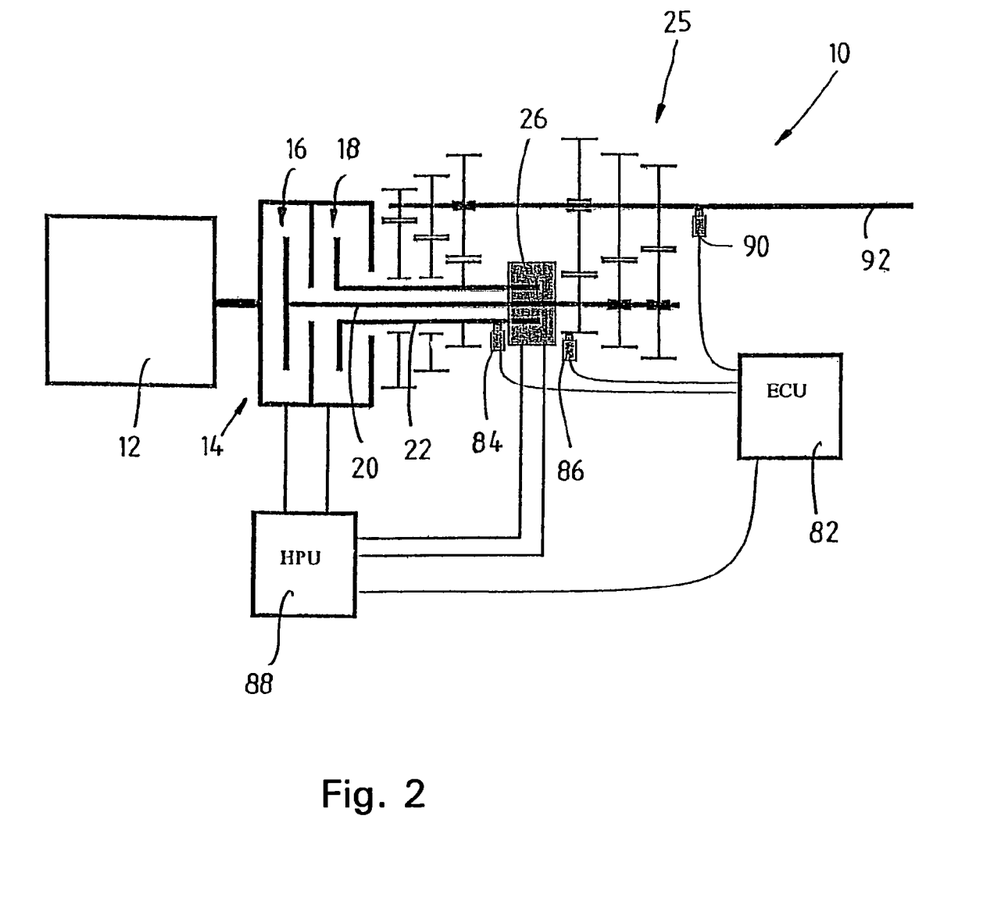
FIG. 2 shows the drive chain of the FIG. 1a in connection with a speed of rotation sensor and a hydraulic unit for the control of the dual clutch and the central synchronization device.

The braking facility of the synchronization device 26 (or 26a, 26b, 26c) can advantageously be controlled by an electronic control unit 82, based on sensor measured signals, which represent the speeds of rotation of the transmission input shafts 20 and 22. In FIG. 2 are corresponding tachometer type sensors indicated and defined by the numbers 84 and 86. If the braking facility concerns a hydraulic brake apparatus, as this is the case in the FIGS. 3 to 5, then the control of the braking facility, that is, of the at least one hydraulic cylinder-piston combination is carried out by the interposing of a hydraulic unit 88. The clutch positionings at 16 and 18 of the double clutch 14, which are hydraulically activated, can even be controlled by the corresponding hydraulic slave cylinder of the dual clutch 14.

In accord with the exceptionally favored embodiment example of the FIG. 2, the hydraulic unit 88 serves both for the activation of the dual clutch 14 as well as for the activation of the central synchronization device 26. The electronic control unit 82 (ECU; Electronic Control Unit) is composed of: at least the sensor 84, 86, which pick up the rates of rotation of the transmission input shafts (using rotationally secure gears with the said shafts), as well as preferably an additional tachometer 90, which captures the instant rotation speed of the transmission output shaft 92. So equipped, the ECU 82 is prepared with rotational signals, to supply the control unit 82 with the required synchronization speed of rotation or with values corresponding to that said speed of rotation, and accordingly control the hydraulic regulation apparatus, in order to input the necessary synchronous speed of rotation. Advantageously, the electronic control circuit can realize the respectively necessary synchronizing speed of rotation by the interposing of the hydraulic unit 88 and the braking facility of the synchronization device 26.

The invention claimed is:

1. A dual clutch transmission (25) for a motor vehicle, the dual clutch transmission (25) comprising;
   a first transmission input shaft (20) to which a first gear stage is assigned and a second transmission input shaft (22) to which a second gear stage is assigned,
   wherein one of the first and the second transmission shafts is an outer hollow transmission input shaft (22) and the other of the first and the second transmission shafts is an inner transmission shaft (20) coaxial enclosed within the outer hollow transmission input shaft (22);
   a synchronization device (26) is located within the transmission for synchronization of rotational speeds of the first and the second gear stages upon shifting from one of the gear stages assigned to one transmission input shaft to another of the gear stages assigned to the other of the transmission input shafts during one of acceleration and deceleration;
   the synchronization device (26) including at least first and second planetary gear sets (30, 40) and a braking facility (50), the first and the second planetary gear sets (30, 40) are axially adjacent one another and are placed essentially coaxially to and in functional connection with the first and the second input shafts (20, 22); and
   a first component (34; 42) of each of the first and the second planetary gear sets (30, 40) is one of coupled with or couplable with the first transmission input shaft (20), a second component (32; 44) of each of the first and the second planetary gear sets (30, 40) is one of coupled with and couplable with the second transmission input shaft (22), and a third component (36; 46) of each of the first and the second planetary gear sets (30, 40) is couplable to a brake facility (50), supported by a transmission housing wall, by which the synchronization device can be braked.

2. The dual clutch transmission according to claim 1, wherein the first component (34; 42) is one of securely connected to the first transmission input shaft (20), constructed therewith or is formed as one piece therewith, and the second component (32; 44) is one of securely connected to the second transmission input shaft (22), constructed therewith or is formed as one piece therewith.

3. The dual clutch transmission according to claim 1, wherein an internal gear (36; 46) is the third component which is braked by the brake facility (50).

4. The dual clutch transmission according to claim 1, wherein the first and the second planetary gear sets (30, 40) are assigned in such a manner to the transmission input shafts (20, 22) that for both shifting up between a first and a second, as well as shifting down between the second and the first gear, a synchronization during one of deceleration or acceleration is possible.

5. The dual clutch transmission according to claim 1, wherein the first planetary gear set (30) is assigned to the transmission input shafts such that a sun gear (34) of the first planetary gear set (30) is one of coupled with and couplable with the inner transmission input shaft (20), and a planetary gear carrier (32) of the first planetary gear set (30) is one of coupled with and couplable with the outer transmission input shaft (22).

6. The dual clutch transmission according to claim 1, wherein the second planetary gear set (40) is assigned to the transmission input shafts such that a planetary gear carrier (42) of the second planetary gear set (40) is one of coupled with and couplable with the inner transmission input shaft (20) and a sun gear of the second planetary gear set (40) is one of coupled with and couplable with the outer transmission input shaft (22).

7. The dual clutch transmission according to claim 4, wherein a sun gear (44a) of the second planetary gear set (40a) and a planetary gear carrier (32a) of the first planetary gear set (30a) are securely connected to assure a common rotation with each other.

8. The dual clutch transmission according to claim 4, wherein the first and the second planetary gear sets (30, 40) are placed in an axial zone of the first and the second transmission input shafts within a transmission housing (24) where the second transmission input shaft (22) terminates.

9. The dual clutch transmission according to claim 6, wherein the second planetary gear carrier (42) is one of coupled with the first transmission input shaft (20) and is located axially beyond an end of the second transmission input shaft (22).

10. The dual clutch transmission according to claim 1, wherein the second transmission input shaft (22) possesses one of a section near the end of the second transmission input shaft (22) and within the transmission housing and the end of the second transmission input shaft (22) and a section remote from the end, which sections, by which a planetary gear carrier (32; 32a) are coupled with one another in a rotationally secure manner.

11. The dual clutch transmission according to claim 1, wherein the second transmission input shaft (22) possesses at least one opening, through which a planetary gear (38c), which is borne by planetary gear carrier (32c), the planetary gear carrier (32c) is coupled with, or can be coupled with, the outer transmission input shaft (22) and the planetary gear (38c), can extendingly engage with a sun gear (34c) which is one of coupled with and couplable with the first transmission input shaft (20).

12. The dual clutch transmission according to claim 4, wherein the first and the second planetary gear sets (30, 40; 30a, 40a) each respectively possess at least one of:
sun gears having one of equal diameters and equal tooth-counts,
planetary gears having one of equal diameters and equal tooth-counts, and
internal gears having one of equal diameters and equal tooth-counts.

13. The dual clutch transmission according to claim 1, wherein each of the first and the second planetary gear sets (30, 40) possess three planetary gears.

14. The dual clutch transmission according to claim 1, wherein at least one of a first and a second planetary gear carrier (32, 42) is constructed as a disk with at least one rotation-capable axle pin (80a) projecting therefrom for an assigned planetary gear.

15. The dual clutch transmission according to claim 1, wherein the brake facility (50) is a wet-running multi-disk brake assembly.

16. The dual clutch transmission according to claim 15, wherein the multi-disk brake assembly (50) comprises:
at least one actuator (64),
at least one disk (52; 58) standing perpendicularly, outwardly directed, from the third component (36; 46) and having a rotationally secure connection therewith, and
at least another disk (54, 56; 60, 62) affixed to the transmission housing so as to prevent rotation; whereby the at least one disk, and the at least another disk can be brought into friction tight closure in order to subject an internal gear to braking.

17. The dual clutch transmission according to claim 16, wherein the actuator is a hydraulically actuated cylinder/ring piston combination (64).

18. The dual clutch transmission according to claim 4, wherein an actuator is commonly assigned to both the first and the second planetary gear sets (30, 40), which actuator functions as a cylinder-ring piston combination (64) by which one of an internal gear (36) of the first planetary gear set (30) and an internal gear (46) of the second planetary gear set (40) is subjected to braking.

19. The dual clutch transmission according to claim 1, wherein a sensor arrangement (84, 86, 90), for capture of at least two gear stage speeds of revolution, and one control/regulation apparatus (82), which received signals of the captured rotation speeds from the sensor arrangement and, on the basis of the received signals, in connection with a shifting operation, controls the braking facility (50) by which a speed of rotation conducive to synchronization is achieved.

20. The dual clutch transmission according to claim 1, wherein the transmission further comprises a drive unit (12) and a dual clutch (14) for torque transfer between the drive unit and the transmission.

21. The dual clutch transmission according to claim 1, wherein each of the first and the second planetary gear sets (30, 40) comprises a sun gear (34; 44), a planetary gear carrier (32; 42) and an internal gear (36; 46);
the first component is the sun gear (34) of the first planetary gear set (30) and the planetary gear carrier (42) of the second planetary gear set (40) which are both fixedly coupled with the first transmission input shaft (20);
the second component is the planetary gear carrier (32) of the first planetary gear set (30) and the sun gear (44) of the second planetary gear set (40) which are both fixedly coupled with the second transmission input shaft (22); and
the third component is the internal gears (36; 46) of both of the first and the second planetary gear sets (30, 40) which are both releasably coupled by the brake facility (50) to the transmission housing wall.

* * * * *